(12) United States Patent
Cook

(10) Patent No.: US 11,377,233 B1
(45) Date of Patent: Jul. 5, 2022

(54) SYSTEMS AND METHODS FOR PERFORMING REMOTE MAINTENANCE

(71) Applicant: Charter Communication Operating, LLC, St. Louis, MO (US)

(72) Inventor: Charles Ivan Cook, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 359 days.

(21) Appl. No.: 16/517,494

(22) Filed: Jul. 19, 2019

Related U.S. Application Data

(60) Provisional application No. 62/732,057, filed on Sep. 17, 2018, provisional application No. 62/700,895, filed on Jul. 19, 2018.

(51) Int. Cl.
*H04L 43/50* (2022.01)
*B64D 47/08* (2006.01)
*B64F 1/00* (2006.01)
*H04L 67/125* (2022.01)
*H04L 67/52* (2022.01)
*B64C 39/02* (2006.01)
*G05D 1/00* (2006.01)

(52) U.S. Cl.
CPC ............ *B64F 1/007* (2013.01); *B64C 39/024* (2013.01); *B64D 47/08* (2013.01); *G05D 1/0022* (2013.01); *H04L 43/50* (2013.01); *H04L 67/125* (2013.01); *H04L 67/18* (2013.01); *B64C 2201/027* (2013.01); *B64C 2201/146* (2013.01)

(58) Field of Classification Search
CPC . B64F 1/007; B64C 39/024; B64C 2201/027; B64C 2201/146; B64D 47/08; G05D 1/0022; H04L 43/50; H04L 67/125; H04L 67/18
See application file for complete search history.

(56) References Cited

U.S. PATENT DOCUMENTS

2017/0129603 A1* 5/2017 Raptopoulos ........ G08G 5/0069
2019/0028904 A1* 1/2019 Carpenter ............ G08G 5/0091

* cited by examiner

*Primary Examiner* — Mathew Franklin Gordon
(74) *Attorney, Agent, or Firm* — Dority & Manning, P.A.

(57) ABSTRACT

Various embodiments provide systems and/or methods for automated maintenance, delivery, retrieval, and/or communications using drones.

16 Claims, 5 Drawing Sheets

Identify, Align, and Approach

- The drone first uses GPS and/or a combination of directions from a database.
- When the drone is within range, the drone can use a camera and pattern recognition to find the receptacle.
- The camera may also employ a range finder mechanism or a laser or infrared mechanism to guide the drone close enough to attach to the receptacle.

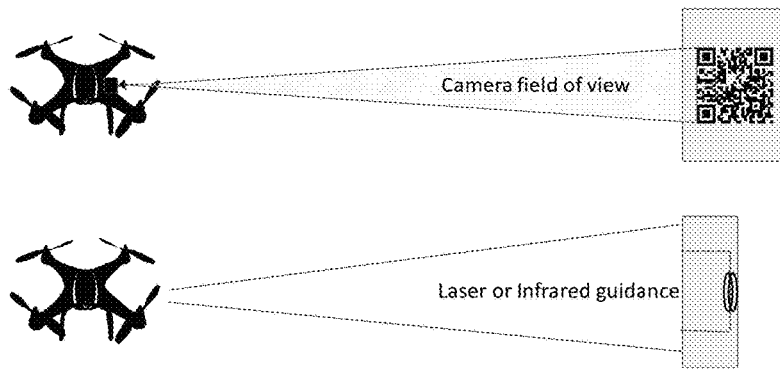

Fig. 3

Suspending Payload Cage From Drone

- Allow the payload cage to hang from the drone. Range of motion is permitted in two directions to keep the payload cage pointing forward. The payload cage, is not permitted to rotate. This allows a reference point to direct the cage to the receptacle.
- The payload cage can move forward and backwards, and then side to side. When an equilibrium point is reached, the payload cage is lock to prevent swinging motions while the drone is in flight.
- The drone can take flight in a stable fashion.
- One the drone is at the receptacle, the drone can either tilt to level the payload cage, or use actuators to level the payload cage.

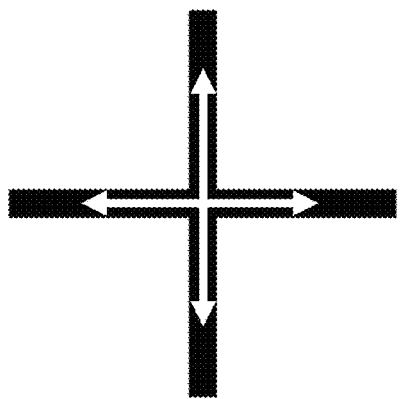

Fig. 4

Balanced Extender Arms

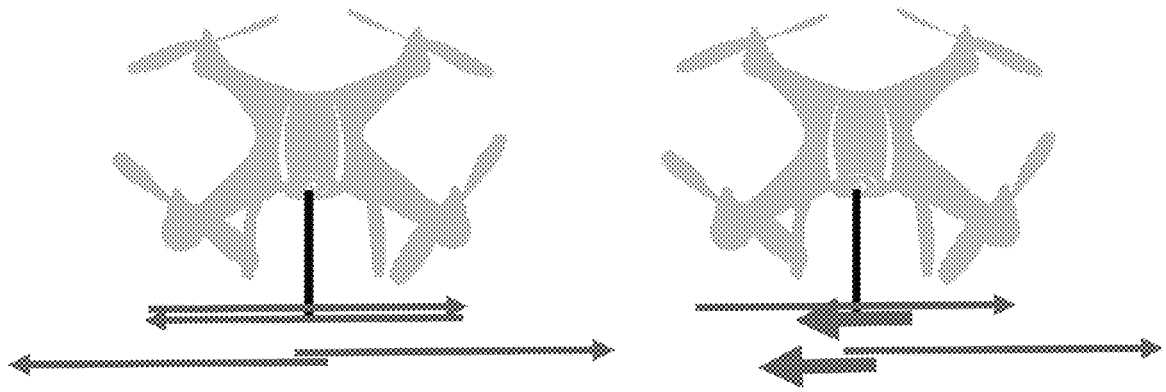

- When a drone is in flight, any arms for attaching to a receptacle needs to be retracted to not extend beyond the reach of the drone rotors. When extending, balance needs to be maintained. The image on the right utilizes a heavier weight so that the counter weighted arm does not extend beyond the reach of the drone rotors.

Fig. 5

Multi-Bay Payload Carrier

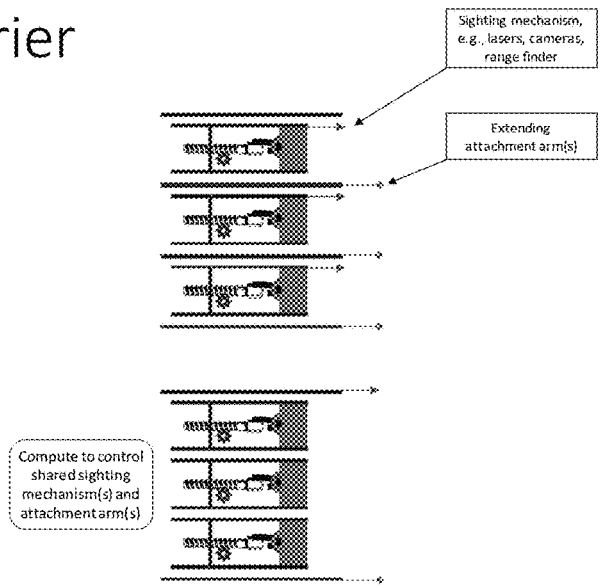

- Multiple bays permit multiple deliveries on a single flight path.
- Bays can be fully autonomous with each containing their own docking arms and sighting mechanisms.
- Alternatively, a single payload cage can provide single set of one or more docking arms and sighting mechanisms that are shared across all bays to reduce overall cost.

Fig. 6

Mail Delivery and Shared Mailbox

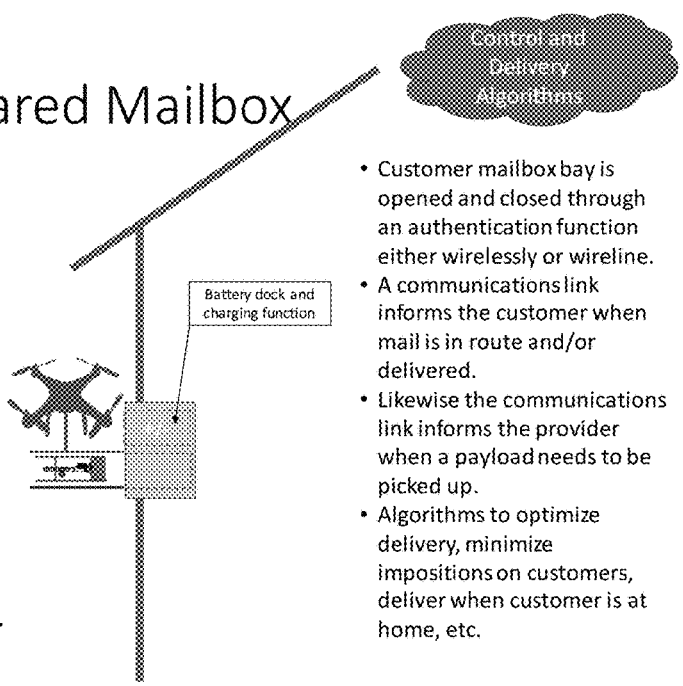

- Mailbox can be mounted in a protective area that is accessible by the drone.
- A shared mailbox between customer and delivery organization.
- Can be used to host and charge batteries and additional payloads destine for other destinations.
- Enables drones to extend flight path or to hand off to another drone to continue a delivery path.

- Customer mailbox bay is opened and closed through an authentication function either wirelessly or wireline.
- A communications link informs the customer when mail is in route and/or delivered.
- Likewise the communications link informs the provider when a payload needs to be picked up.
- Algorithms to optimize delivery, minimize impositions on customers, deliver when customer is at home, etc.

Fig. 7

001
SYSTEMS AND METHODS FOR PERFORMING REMOTE MAINTENANCE

CROSS REFERENCE TO RELATED APPLICATION

The present application claims priority to (i.e., is a non-provisional of) U.S. Pat. App. No. 62/700,895 entitled "System of Automated Maintenance, Delivery, and Retrieval Using Drones", and filed Jul. 19, 2018 by Cook; and U.S. Pat. App. No. 62/732,057 entitled "A System of Automated Maintenance, Delivery, Retrieval, and Communications Using Drones", and filed Sep. 17, 2018 by Cook. The entirety of both of the aforementioned applications is incorporated herein by reference for all purposes.

BACKGROUND OF THE INVENTION

Various embodiments provide systems and/or methods for automated maintenance, delivery, retrieval, and/or communications using drones.

Currently repair of network resources requires dispatch of a truck including a human operator to diagnose and/or repair network equipment. As the quantity of network equipment increases, the costs of network maintenance also increases.

Thus, for at least the aforementioned reasons, there exists a need in the art for more advanced approaches, devices and systems for monitoring.

BRIEF SUMMARY OF THE INVENTION

Various embodiments provide systems and/or methods for automated maintenance, delivery, retrieval, and/or communications using drones.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3 graphically shows a process of identifying, aligning, and approaching a maintenance location or mail box by a drone in accordance with some embodiments;

FIG. 4 graphically shows a process for suspending a payload cage from a drone in accordance with one or more embodiments;

FIG. 5 shows the use of balanced extender arms in a drone in accordance with various embodiments;

FIG. 6 shows a multi-bay payload carrier in accordance with some embodiments;

FIG. 7 graphically shows a method for mail delivery and shared mailbox in accordance with some embodiments.

DETAILED DESCRIPTION OF THE INVENTION

Various embodiments provide systems and/or methods for automated maintenance, delivery, retrieval, and/or communications using drones.

Use drones for automated repair, upgrade, replacement of a device in a system including the replacement of individual components including battery replacement.

One use case is that of replacing 5G radios and/or antennas and/or batteries for the purpose of repairing, upgrading, and/or providing power and/or emergency backup power.

Figure 1:
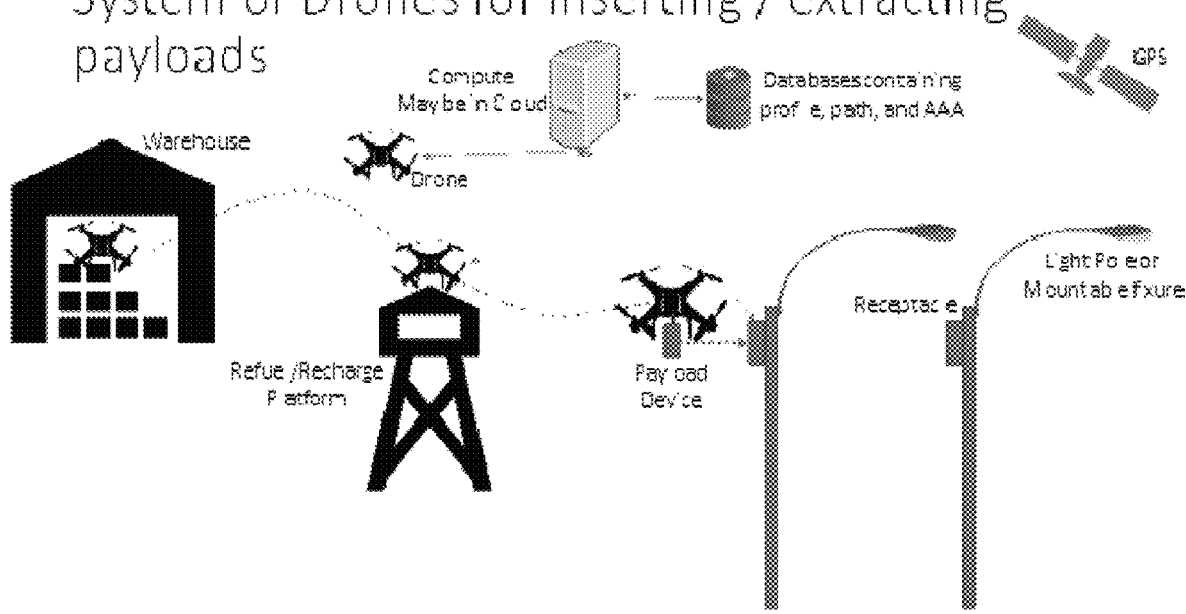
FIG. 1 shows a system of drones for inserting and/or extracting payloads in accordance with various embodiments.

It is projected that in the near future today's wireless data network will transition from 4G wireless devices to 5G wireless devices. 5G wireless is characterized by much higher data rates, much smaller cells, and much lower latency. This translates into the deployment of 5G radios every few hundred-feet or less. One configuration could be the deployment of 5G radios on every light pole in a neighborhood as shown in FIG. 1.

Another configuration could be the deployment of 5G radios in or on buildings and houses. When deployed on light poles, power is drawn from existing power used to illuminate the street light. It is required that a source of backup power be provided. This can be done by connecting the string of street lights to a source of backup power such as a generator with or a bank of batteries with a transfer switch. Alternatively, a backup battery can be installed at the site of the 5G radio in, on, or near the light pole. In the case of mounting radios on buildings and houses, a source of backup power could be a UPS with easy access to batteries from the exterior of the building or house for easy replacement.

Radio technology continues to evolve rapidly. It is not uncommon for a radio technology to become obsolete in three years or less. The combination of small cells, rapid technology evolution, and radio repair puts a huge economic strain on the upgrade and maintenance of radio networks. Each time a radio needs to be repaired and/or replaced, a truck roll is required resulting in substantial cost to the wireless service provider. Consequently, there is a need for a system that is capable of upgrading and maintaining the radio network.

Various embodiments can be used to enable drones to replace existing 5G radios with upgraded radios, or to replace defective 5G radios. Generically, drones can be used to replace any device that a drone is able to carry as payload. In some embodiments, the packaging of devices is done in a manner that facilitates easy installation and removal of the device in a docking station. The device could be any number of things including radios, antennas, batteries, etc.

One example could be the deployment and/or replacement of 5G radios in a docking receptacle that provides power and a data connection to the 5G radio. The data connection could be an Optical Network Terminal (ONT) mounted in a location accessible by the drone. The ONT could provide data access to both the tenant of the building the ONT is mounted on, and to a wireless service provider deploying a "small Cell" via a docking station connected to the ONT. In this case the service provider would provide a port on the ONT that provides service to the tenant of the building as retail customers, and one or more ports to wireless service providers as wholesale customers. Additionally, a retail customer could also make a retail port available to another service provider through appropriate agreements that are within the constraints of the service contract they have with the service provider providing network services to the retail customer.

Another example could be the deployment and/or replacement of batteries in a battery receptacle in a location accessible by the drone. In some embodiments, the drone can be used to replace the batteries of another device (not the drone itself). The batteries being replaced could be, but are not limited to, UPS batteries to provide battery backup of an ONT in the event of a power outage. Telecommunications providers are required to provide options for providing backup power for voice services. Currently providing backup power for data services is optional, but may be required in the future.

In this implementation, the battery receptacle monitors the state of the battery. When the battery receptacle determines that the battery is no longer performing satisfactorily, a notification is sent to the service provider (or the entity responsible for the batteries). The service provider contacts the drone dispatch organization. The drone dispatch organization in turn transports a new battery to the receptacle location. At the receptacle location, the drone extracts the spent battery, and replaces it with a good battery. The process of replacing a battery can employ one or more drones. A single drone may be capable of performing all necessary operations, or the necessary operations may be performed by drones specialized to perform specific functions.

The location of the receptacle (whether the receptacle hosts a battery or some other device) is mapped to a geographic location. The geographic location is stored in a database for future use. The receptacle also has a unique identifier to ensure that the geographic location can be assigned to the receptacle. The unique identifier could be a MAC address or some other means of uniquely identifying the device. When the receptacle reports that the device that it hosts needs to be replaced, it sends the unique identifier. The unique identifier could be the geographic coordinates of the receptacle. The drone service receives the request and uses the unique identifier to determine the geographic location of the receptacle, and the device that it is hosting that needs to be upgraded or replaced. This information can also be combined with other information that may be needed to configure the device if necessary and to generate any necessary billing information. The drone service then dispatches the drone with the appropriate device to the geographic location. Upon arrival at the geographic location, the drone confirms that it has arrived at the correct receptacle location. Confirmation may be optical (e.g., reading a barcode), or wireless through BlueTooth™ or any appropriate wireless technology. Other forms of confirmation can also be envisioned.

The drone, either by itself or in conjunction with other drones, orchestrates the removal of the old and/or defective device, and the installation of the new and/or upgraded device. The receptacle then contacts the appropriate configuration servers to receive any additional installation instructions, and performs them. Meanwhile the drone returns the old and/or defective device and prepares for the next delivery.

The trigger to initiate the exchange of a device hosted in a receptacle can also be initiated from a source other than the host. It can be triggered by a service provider, or an equipment provider, or some other authorized source. The discussion includes a means of authorization which may or may not be required depending on the level of security required for the application. In cases where authentication is implemented, the drone service communicates with the authorization service to obtain authorization prior to delivery and installation of the device.

In another embodiment, the receptacle could contain an access code that either the customer or provider of the service is able to manage. The authorization code must be exchanged and confirmed before the drone will be able to remove the device from the receptacle or install a device into the receptacle. The receptacle itself may contain a locking mechanism that prevents theft or unauthorized actions to take place.

To facilitate removal and installation in more locations, the drone may implement a system of counter balances in order for it to extend the device beyond the propellers in order to reach a device that is mounted under the eaves of a roof or on the side of a building. The drone may also employ a robotic arm capable of sufficient articulation to align and position the device into the receptacle. The drone has sensing capabilities to protect itself from running into the building, house, light pole, or other obstacles. Additionally, a description of the environment surrounding the receptacle may also be include in a profile that is mapped to the device receptacle.

To facilitate extraction and insertion of devices, the receptacle may employ beveled guides to ensure that drones do not have to be positioned exactly in order to perform their function. The receptacle may also employ mechanical or electromechanical means to ensure secure attachment and easy detachment. Furthermore, if implemented electromechanically, the drone may also include power probes to source sufficient power to actuate the electromechanical circuitry of the docking station and device in the event that the docking station does not have reserve power on its own to perform the function.

This discussion to this point assumes that the receptacle is permanently fixed to a specific geographic location. However, another embodiment could be a receptacle that is mobile. The principles are the same with the exception that the mobile receptacle must update the profile associated with the unique identify of location updates. If the location is continuously changing, then information about the continuously changing location must be provided to enable the drone to find the mobile receptacle, associate with the mobile receptacle, and engage in exchanging the device hosted by the mobile receptacle.

When the drone inserts or extracts the device into the receptacle, it is difficult for the drone to exert pressure one direction or another through only the use of the spinning rotors that are used to fly the drone. Relying only on the rotors would put a tremendous strain on the drone and require a much more powerful drone to perform the insertion/extraction function. To reduce the strain on the drone and enable smaller drones to be utilized, this invention utilizes a method analogous to isometric contraction and extension of muscles. Isometric exercises are characterized by pitting one muscle or part of the body against another or against an immovable object in a strong but motionless action.

In the case of a drone carrying a device to be installed into a receptacle or extracting the device from the receptacle, the drone includes a frame or enclosure that carries the device. The frame or enclosure includes an extension that attaches to the receptacle. The extension can be an assembly of one or more hooks. The hook engages with the receptacle by catching onto an edge. The frame or enclosure may contain a motor, solenoid, or other actuating mechanism that pushes or pulls the device into or out of the receptacle. For example, a motor can be controlled to turn a screw that moves the device in or out of the receptacle while the frame or enclosure is held onto the receptacle by an assembly of one or more hooks.

The process of actuating a mechanism can potentially be interrupted. The interruption may be caused by an unexpected loss of power. If power is lost by the drone, power can be sourced by the receptacle as a means of backup.

Figure 2:
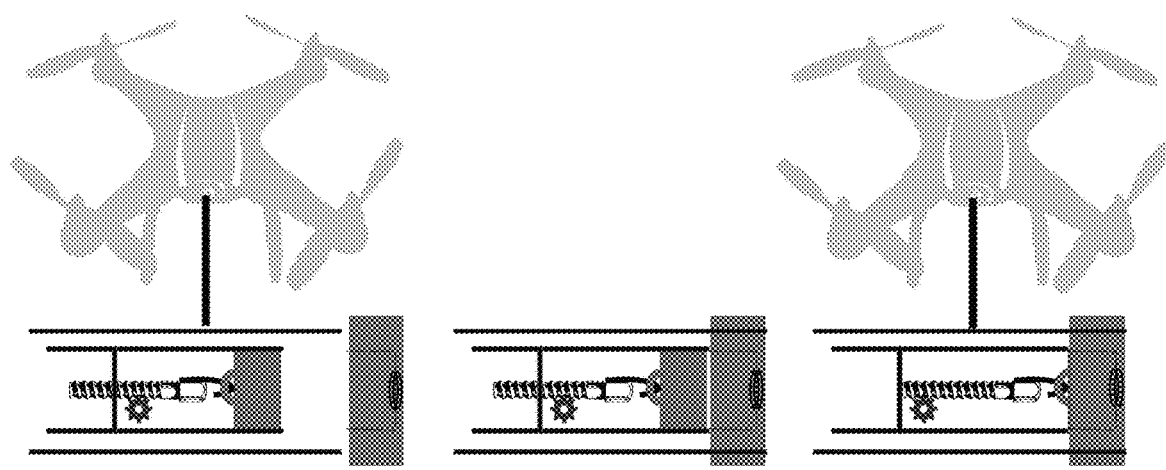
FIG. 2 graphically shows detail of an insertion and/or extraction process in accordance with some embodiments.

The process of engaging or disengaging can also potentially be interrupted. If the drone is in the process of disengaging fails, the receptacle can disengage the drone. This process is graphically shown in FIG. 2.

When the drone approaches the target receptacle, it may need additional guidance for a number of reasons. For example, the GPS coordinates of the receptacle may not be accurate. The drone GPS may not be accurate because it may not be able to see a sufficient number of satellites. Typical GPS accuracy was reported to be 2.3 ft 95% of the time. The receptacle may be under the eve of a roof to protect it from the elements, or to improve aesthetics resulting in the drone not being able to maintain line-of-sight with one or more of the GPS satellites.

Consequently, there is a need for additional guidance for the drone during the last few feet of travel, and to line up the drone's payload delivery mechanism with the receptacle's docking mechanism. This invention includes multiple mechanisms:

Optical: When the drone gets sufficiently close to the target receptacle, it uses a camera and shape recognition algorithms to identify the target receptacle. The algorithms can be programmed to recognize the shape of the receptacle. For more additional accuracy, a pattern can be attached to the receptacle. The pattern could be a high contrast image that may include a unique identifier of the receptacle. A unique identifier becomes increasingly important when more than one receptacle is within close proximity. Alternatively, the receptacle could emit a unique beacon. The beacon could be transmitted in an appropriate RF or light beam. The beacon may be in the off state, and then when the drone approaches, the drone can signal to the receptacle to turn on its beacon. Triangulation of RF signals or images can be used to align the drone payload delivery system with the receptacle, and to gauge distance between the drone and the receptacle similar to range finders or focusing mechanisms in cameras. The drone could also use one or more lasers in conjunction with a camera to align the payload delivery mechanism. The drone uses algorithms to aim the laser so it hits the desired target. By using multiple lasers, or by using a single laser and switching it between multiple predetermined locations on the receptacle, the drone is able to align the payload delivery mechanism and gauge distance to the receptacle.

Additional methods that may be employed for final alignment may include a protrusion such as a rod that the drone aims into a hole on the receptacle. Alignment can be done with one protrusion, but may be easier with three protrusions corresponding to three holes spaced such that only one orientation will match the protrusions with the holes. An example of such a method is graphically shown in FIG. 3.

Contact Mechanisms:

The payload generally will need to make electrical contact. Although there may be some applications where electrical contact may not be necessary. To ensure solid contact (electrical or not), the part of the receptacle that is to mate or make contact with the payload is spring-loaded (or alternatively the implementation of spring pressure can be implemented on the payload itself (this approach reduces the chance of failure on the receptacle side. If the spring mechanism on the payload fails, the drone can return the fail payload and retrieve a replacement). The spring mechanism applies pressure to electrical contacts to ensure that electrical connectivity in ensured. It also ensures to secure the payload to the receptacle whether there are electrical contacts or not.

Locking/Unlocking Mechanism: The attaching mechanism could be a system of one or more screw drives driven by motors with limiting switches that cause the screw drive to stop at a predetermined location that results in sufficient pressure on the electrical contacts or payload to ensure that it is secure. The screw drive is locked so that no further revolutions can take place. An alternative securing mechanism could be a system of one or more hooks that are locked into place by latching solenoids or similar. To release, the screw drive is reversed, or the solenoids are latched to the opposite position.

Insertion/Removal Mechanisms:

When the payload delivery frame/enclosure is locked into place, one or more motors or solenoids push the payload into place. The payload has a receiving loop or hole that allows for the reception of a hook that can be locked into place. Once the hook is in place, the motors or solenoids can push or pull as appropriate to install or remove the payload. If installing, the hook releases upon installation. If removing, the hook stays engaged until the payload can be delivered or returned as appropriate.

Payload Suspension Mechanisms:

In order for the drone to fly effectively, the payload needs to be as balanced as possible. While it is still possible for a drone to adjust to an unbalanced payload, it can do only so much. At a certain point, there may be too much imbalance for the drone to overcome. One way to increase the balance is to have a single attachment point centered under the drone. The single attachment point is initially allowed to pivot in response to forces of gravity. Once it is in equilibrium. Then a solenoid or plunger is actuated automatically or manually to secure the payload in place. To ensure that the payload can be lined up with the target receptacle, the pivot may be slotted so that the front of the payload directly aligns with the front of the drone.

For more advanced drones, a system of drives may be employed to align the payload to the receptacle once the frame or enclosure that carries the payload is secured to the receptacle. This is in the event that the payload is unbalanced, so the pivot mechanism results in the payload not being able to hang in an aligned position during flight. One embodiment of such a system is shown in FIG. 4.

Balancing:

When in flight, the system of payload and payload carrier needs to be as balanced as possible. It is also beneficial to not have anything protrude out from the drone unnecessarily during flight. But when the drone approaches the receptacle to dock, a protruding arm will allow the drone to align and dock without the rotors hitting the side of the building. To facilitate this, the drone extends an arm towards the receptacle. At the same time, a counter weight is extended in the opposite direction to keep the drone balanced. The counterweight mechanism can be a mirror image of the arm. But in some situations, it may not be possible to extend an arm the same distance backward as forward. So some counter-balance mechanism may have a greater weight on the back side so it does not need to extend as far to maintain balance as the attaching arm extends out. Such a balancing approach is graphically shown in FIG. 5.

Additional information that can be retrieved by means of a unique identifier.

The unique identifier also allows for retrieval of information that dictates requirements on the drone. For example, because of the location of the receptacle, the drone must be a certain size. Another piece of information that can be communicated is the size of the receptacle to ensure that the correct payload is selected, and that it will fit into the receptacle.

Machine Learning:

As the drone traverses the path between the receptacle and another location (e.g., a warehouse, an intermediate drone platform, a power station, etc.), information about the path traversed is recorded and stored in a database. This information is retrieved when the drone receives a flight plan. The drone uses AI (artificial intelligence) for object avoidance. The path information is used to get to the destination in conjunction with AI algorithms. If AI determines that the flight needs to be altered, it provides augmented flight instructions to the drone. The resulting new flight instructions are communicated back to the database. This may result in an area where there is construction. Or perhaps over time a tree has grown in the original path.

If the flight alteration is due to a collaborative flight adjustment to avoid running into another drone that happens to be in the flight path, the original flight path is maintained unaltered in the database because it is assumed that avoidance with another drone will not be necessary the next time the drone is requested to take that flight path. However, information of a drone avoiding another drone can be collected and stored in a database for future use in scheduling drones. The scheduling algorithm has the capability to update a path route database if it determines it necessary to minimize intersecting drone paths. Each drone when it encounters another drone, exchanges identification information for future use by the scheduler or regulatory bodies (if necessary).

Secure Access:

Devices that are inserted and extracted from the receptacles are vulnerable to theft or tampering unless the devices can be secured. One component of this equation is securely attaching the receptacle to a hosting building or vehicle. Additionally, the device must be able to be secured into the receptacle. There are multiple ways this can be done.

In addition to other information that gets associated with the unique identifier of the receptacle, the owner of the receptacle can associate a certificate with the unique identifier, and the receptacle can be programmed with the certificate. When the drone needs access to the receptacle to insert or extract a device, the payload cage/drone is programmed with an authenticating certificate provided from the organization requesting access to the receptacle. If the requesting organization is not the owner of the receptacle, they must also obtain authorization from the owner of the receptacle. The authenticating certificate is generated based on the unique identifier of the receptacle, a time window for when the device will be extracted/inserted, receptacle owner authorization, and possibly the delivery path.

If there is no communication path for a simplified receptacle, the certificate is embedded and is not changeable. That means the certificate cannot be changed. But the rest of the process above is still applicable.

As the drone approaches the receptacle, communication is initiated and certificate information exchanged to authorize the drone to insert/extract the device. When the device is inserted, a locking mechanism is released to allow the insertion, and then when the device is docked within the receptacle, the receptacle locks it in place. Likewise, when extracting the device, the receptacle releases the locking mechanism, the device is extracted, and the receptacle is locked to prevent an unauthorized insertion. Of course, the process of extraction and insertion can be combined and performed as a single transaction if configured to do so.

This patent disclosure is also applicable to IoT (Internet of Things). Just like in telecom, IoT devices will either need to be upgraded or their batteries replaced. The sizes and shapes of the payload enclosure that contains the IoT device and the receptacle may be different, but the concepts are the same. It is likely that IoT devices will be smaller, hence the ability to find the correct receptacle through a combination of GPS and/or other location finding technologies will be even more important. And it is likely that the approach will need to be even more accurate.

Drones themselves can host sensors for measuring weather conditions, and perform mapping functions. Sensor data may be transmitted for real-time applications, or stored and uploaded into a data lake or appropriate databases for subsequent analysis and processing.

Drones can collaborate as a low-altitude network to transport telemetry information about the drones, the receptacles, the payload devices, and the network as well as providing narrow-band and broadband data services. In order to do this, drones can employ SON (Self Organizing Network) algorithms. A traditional SON is static meaning that the transmitters and receivers that form the network are stationary, while client devices may be stationary or mobile. Drones participating in a SON, will also incorporate predetermined flight paths from flight histories into the algorithms and also incorporate real-time inflight perturbation information.

Multiple Delivery Payload Enclosure:

To significantly reduce the cost of delivering a payload, the payload enclosure can be constructed with multiple bays. Each bay contains the payload for a separate delivery. The number of bays is only limited by the overall weight of the payload enclosure and the payloads themselves.

Each bay can have its own arm and camera mechanism locate the receptacle and secure the enclosure to the receptacle. This is the independent bay approach. The control of each of the bays can be designed to communicate independently to the host network that controls the path, and then also communicates with the drone to maneuver the drone along the path. Alternatively, the drone itself can be the communications vehicle. In this configuration, the Drone communications function addresses the needs of the bays serially.

In a more advanced implementation, the drone communications function can aggregate the needs of all the bays and through algorithms and software control optimizes the delivery of the multiple payloads.

In an even more advanced configuration, the bays share a common arm, servo system, and camera under software control where the positioning is dependent on which bay is currently scheduled to deliver its contents. While more complex, costs are reduced. Such a configuration is shown in FIG. 6.

Mailbox:

In addition to delivering a variety of payloads, the drones can also deliver mail and minimize or eliminate the need to dispatch a mail delivery person in a mail delivery truck. To facilitate this, this is an invention of a specialized mailbox. The mailbox may be implemented in a variety sizes, however, when the mailbox is registered, the unique identifier is used to point to a profile that contains information about the size of the mailbox in addition to its location. The mailbox may be wirelessly enabled with BlueTooth, RFID, or other appropriate wireless mechanism enabled with a security code so that only the authorized drone can access the mailbox. Alternatively, and more securely, the extender arm can be implemented with an electrical connection and a protocol to electrically communicate authentication and authorization information to access the mailbox. Upon authentication and authorization, the mailbox opens, and the drone is able to insert or retract a payload enclosure. One implementation of the mailbox is to sense either wirelessly, electrically, or by presence whether there is mail in the mailbox. The mailbox can notify the owner of the mailbox by means of wireless or electrical communications that mail is present. Likewise, when mail is to be sent from the mailbox owner to another recipient, the mailbox can detect the presence of the outgoing mail and through a wireless or wireline network communicate with the post office or delivery organization that there is mail to be picked up. A drone is dispatched, and retrieves the mail for further processing.

Various business models can be enabled with appropriate price structures that enable services that range from immediate dispatch or immediate delivery, to a best effort type of delivery where a drone may not be dispatched until a certain number of deliveries are pending in a geographic area, or until a multi-bay payload enclosure can be filled. Or deliveries only occur at a predetermined time of day. Or deliveries are only made when the Cellphone indicates to the delivery organization that they are home, etc. Or in some cases delivery may need to be made when people are not at home to minimize disturbing them if the drone is somewhat noisy.

The mailbox can be installed under the eves of a roof to aid in protecting it from the elements.

Shared Function Mailboxes:

The mailboxes may also be implemented with spare bays that can be used in a shared environment. This allows for a drone to make an intermediate delivery that will later be picked up by another drone to transport the payload closer to its destination. An implementation may also contain a specialized bay or bays designed for housing drone batteries. The batteries are uniquely identified and their history and condition are tracked. Drones are then able to include additional batteries and deposit them in specialized bays for other authorized drones to access so that they can continue along their flight path without having to return to a main hub to receive charged batteries.

As part of a service relationship between the drone operator and the owner of the mailbox. In some embodiments, the host and/or owner of the mailbox could be, for example, a home owner or a business owner. In other embodiments, the host and/or owner of the mailbox could be, for example, the drone operator. In either case, the host and/or owner or the drone operator could provide power to the mailbox to enable the charging of batteries. This further eliminates a special platform having to be constructed and deployed at regular intervals in order to effectively recharge drone batteries. Note that some drones are powered by fuel. Fuel refilling stations will likely require construction and placement of platforms. An example embodiment of such a mail-based delivery system is shown in FIG. 7.

Figure 8:
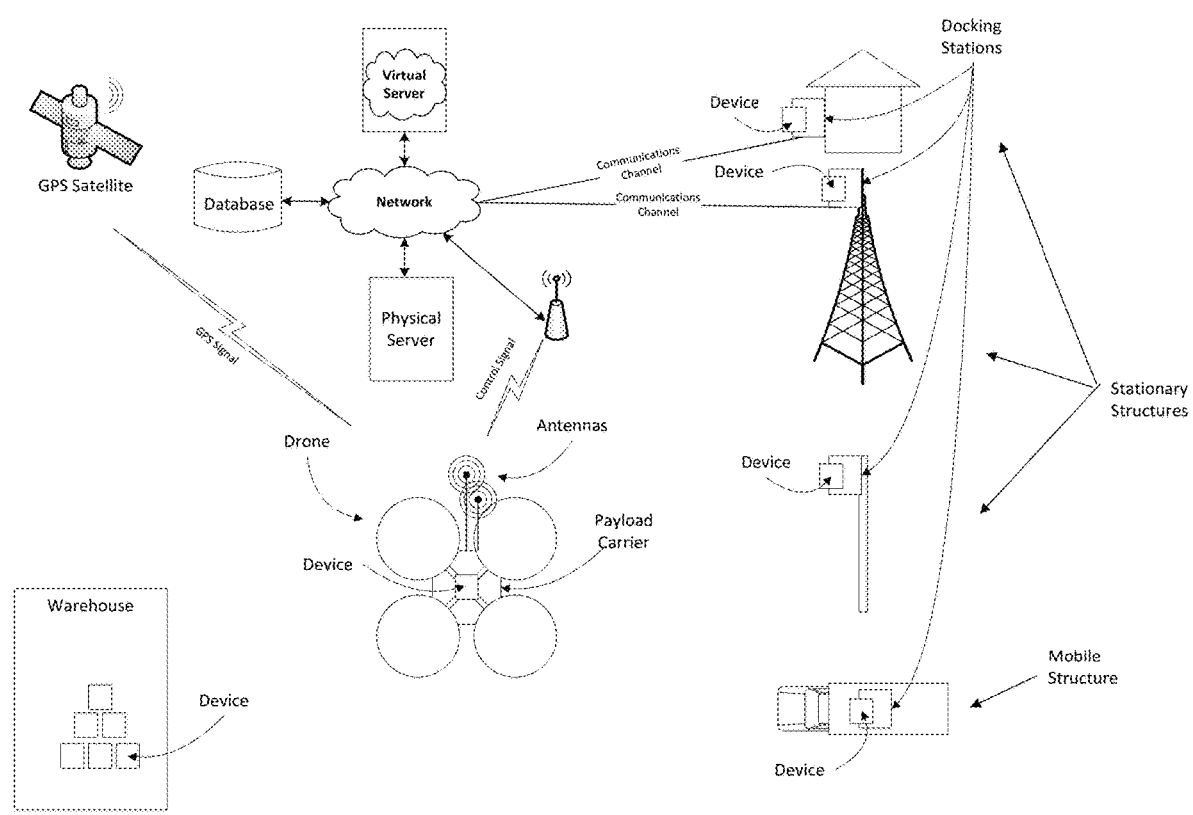
FIG. 8 is a system drawing showing a drone based maintenance system in accordance with one or more embodiments.

Turning to FIG. 8, a system drawing shows a drone-based maintenance system in accordance with one or more embodiments. As shown, FIG. 8 shows a network maintenance system that includes: multiple network device docking stations located at respective network device locations (e.g. on stationary structures such as, for example, a building, a communication tower, a telephone pole, or on a mobile structure such as, for example, a truck). Based upon the disclosure provided herein, one of ordinary skill in the art will recognize a variety of stationary and mobile structures to which network device docking stations may be attached. Each of these network device docking stations is operable to accept at least one network device. Such network device may include, but are not limited to, a network device battery; an Internet of Things device, a sensor, or a radio. Based upon the disclosure provided herein, one of ordinary skill in the art will recognize a variety of network device types that may be deployed in relation to different embodiments.

A central control station (a combination of one or more of a central database, a physical server, and/or a virtual server) is operable to wirelessly communicate instructions to a remote controlled vehicle via a communication network that includes a wireless communication link. In some embodiments, the remote controlled vehicle is a flying drone having an antenna for receiving and/or transmitting wireless communications to/from the central control station, and position determining equipment such as, for example, a satellite based position determination receiver and processor. Additionally, the remote controlled vehicle includes: a payload carrier operable to load and carry at least one network device; a wireless communication receiver operable to receive the instructions from the central control station and to store the instructions to a computer readable medium; a processor operable to access the instructions from the computer readable medium and to execute the instructions. Executing the instructions by the processor causes the remote controlled device to: move to the warehouse and retrieve at least a first network device from the warehouse using the payload carrier; move to a selected one of the network device locations; de-install a second network device from a network device docking station at the selected network device location using the payload carrier; and install the first network device into the network device docking station using the payload carrier.

In some embodiments, the network device docking station is located within a housing, and wherein the housing includes an access panel. In some cases, the access panel is opened based upon an instruction sent to the network device docking station from the central control station. In other cases, the access panel is opened based upon an instruction sent to the network device docking station from the remote controlled vehicle. In various cases, the access panel is controlled by a gear drive.

In various embodiments, the maintenance system further includes a refueling/recharging station accessible to extend the service window of the remote controlled vehicle. In some embodiments, the remote controlled vehicle further includes a camera operable to identify a receptacle in the network docking station to accept the first network device. In one or more embodiments, the remote controlled vehicle further includes a range finder operable to determine a distance from the remote controlled vehicle to the network docking station.

In some cases a receptacle is designed to be able to dissipate thermal power. The receptacle could also have modular fan ports for receptacles that will be hosted devices that dissipate more heat.

The shape of the receptacle can be tapered in so as to guide the payload into position.

To facilitate insertion and extraction of the payload, a receptacle can use fins for the payload to ride on to reduce friction. A more complex receptacle can use wheels, rollers or bearings to reduce friction.

The exterior of the receptacle can be shaped to guide the extender arms in to place. The guides can be thin-edged fins rather than wide surfaces to reduce friction.

Payload Carrier:

To facilitate insertion and extraction of the payload, a simplified payload carrier can use fins for the payload to ride on to reduce friction. A more complex payload carrier can use wheels, rollers or bearings to reduce friction.

Networked Drone Controllers: Drone controllers are spaced along the path of a delivery route. The controller signal is transferred from one transmitter to the next to maintain contact with the drone throughout route. The transceivers can be independently deployed. Additionally, they can be deployed in the receptacles themselves so as the network adds more receptacles, additional control transceivers are added.

It could be implemented in a manner similar to a WiFi Network where a client is handed off from one AP to the next. The purpose of a continuous path of Network Drone Controllers is to extend communications range, enable the drone to continuously transmit sensor data including video, and enable a centralized controller to update the drone flight plan in real time at any point of the flight path either due to a change in plans, or in response to sensor data provided by the drone.

There can be multiple types of receptacles: 1) A receptacle that connects to the Internet. This can provide a connection back to centralized control. 2) A receptacle can be passive. 3) A receptacle can provide a wireless WAN connection to a LAN if the device in the receptacle is a client radio of the wireless WAN. 4) A receptacle can provide power through PoE or other means and may include backup batteries. 5) Any combination of the above.

Radio Installation and Configuration: The payload carrier can deliver and install radios, IoT device, or other devices on behalf of wireless service providers or other service providers. Once the device has been installed, the payload carrier and or drone can wirelessly or electrically configure and test the device through establishing communications channel(s) between the device and locally with configuration information being carried by the drone or payload carrier. Or enable communication between the installed device and a network service via a LAN/WAN connection of the customer if the receptacle has that type of connectivity. Or a communications channel can be established through the drone or network of drones or other wireless network to connect the installed device to a network server for configuration and testing. An example of a device that could be installed and configure could be a radio such as a MikroTik RBSXTG-5HPnD-SAr2 SXT SA5 Outdoor 5 GHz WiFi AP.

Extender Arms: Extender arms can be extended and retracted using a worm gear. They can be nested rectangular tubes. One or more sides can be beveled to guide the arms into place. There can be electrical contacts to signal when the arms are in place and locked. The receptacle also may have beveled tracks along the outside of the box to guide the arms into place in the up/down direction. The arms open and close like pliers or robotic grabbers to clamp onto the receptacle. A beveled hook/lip on the end of the arms helps to guide the arms into place in the forward/reverse direction.

Attaching to Payload: An extender from the payload carrier with a paddle on the end can insert into a hole like a key into a keyhole. Then simply rotate the extender to engage the payload to insert or extract the payload into the receptacle. Other mechanisms can also be used such as magnets, grabbers, and hooking mechanisms.

Pole Attachment: To enable remote pole attachment and eliminate the need for a specialized technician, the receptacle can be attached to a pole via a drone. The drone attachment mechanism extends a flexible arm/band that curves around the pole. The drone attachment mechanism extends a second arm/band that curves around the opposite side of the pole. The two bands connect via a magnetic or mechanical eye/hook mechanism. One or both of the arms then robotically retracts back into the attachment mechanisms which draws the receptacle against the pole similar to drawing a zip-tie tight into a locked position. A counter-balancing mechanism may also be utilized to improve stability of the drone during installation. One or more such bands/straps can be used to secure the receptacle to the pole. Optionally, the drone attachment mechanize can deploy a second set of counter-balance arms that grip the pole to provide additional drone stability while bands/straps are attaching the receptacle to the pole. A more advanced implementation can: 1) use robotic arms to reach around the pole to attach the straps, or 2) use a visual sensor and target to guide the strap attachment arms to bring them together.

Additional Security: The drone will have multiple levels of protect against jamming, control interruption, and unauthorized assumption of drone control. Instruction updates must be confirmed via encrypted code and an accompanying hash/certificates. This is to ensure that control of a drone cannot be assumed by an unauthorized party. The drone will have a hard-coded return home mechanism that is engaged when certain states or conditions are detected. Multiple GPS systems will be implemented to ensure that GPS is not a single point of failure. If all GPS fails, the drone transmits an alarm. The control system will detect the alarm beacons and triangulate the location of the beacon. The drone utilizes image recognition to select a place to land. If possible, it locates a receptacle and lands there. If that is not possible, image recognition finds a perceived safe place to land. A database of safe landing places is maintained. A copy of those locations can be included as part of the flight plan. If an emergency landing is required and a receptacle is not available, then the save place is located, and the drone hovers until power drops below a threshold. It then lands. This provides some time for retrieval crews to get to the site and minimizes the time the drone may be on the ground and vulnerable. The drone will have multiple power sources to reduce the probability of a mid-air power failure. Drones will be configured to have sufficient reserve power for use in emergency/failure scenarios.

Audio and/or Video Communications: The drone and/or a payload or the combination of both could have the communications capability to provide an audio and/or video channel to communicate a message or establish a communications link with the receptacle or a human being or a smart doorbell system. The audio/video channel can be one-way, two-way or multi-way depending on the type of communications. For example, a simple announcement, a question and answer conversation, a multi-way conversation. The multi-way conversation could be between the sender and the recipient, the recipient and an authenticator, the recipient and a voice response system, the recipient and a help desk, etc. The audio/video could establish a communications channel between the recipient and an artificial intelligence engine or an "Alexa"-like system. The audio/video channel can be used to announce and/or confirm delivery of the payload. It could be used to interact with a 911 PSAP. It could be used to assist in drone recovery. It could be used to inform people of what to do if they find the drone. It could be used to communicate information to a human perhaps in a search and rescue operation or to deliver a subpoena or an audio/video confirmation of delivery. A voice print and/or video/picture image can be used for payload delivery or message reception confirmation. The drone could be sent ahead of first responders to provide instructions and/or deliver medical or other equipment or medicines to assist in the treatment of a victim to save time and provide preliminary treatment while first responders are in transit.

Certified Delivery of Data: The drone can be used for the secure deliver of digital data. The data can be encrypted using AES, RSA, or other appropriate encryption algorithms through a public and/or private key system. And it can be digitally signed through an appropriate hash and consequently able to confirm and authenticate delivery and also able to confirm and authenticate the sender. The data transfer could be via means of a physical device like a USB drive, or it could be electrically or wirelessly communicated as in a server/client configuration. The data delivery local between the receptacle and drone/payload, or via a communications channel established between the receptacle and some other source through the drone.

In conclusion, the present inventions provide for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A remote-controlled aircraft comprising:
   a payload carrier operable to load and carry at least one network device;
   a wireless communication receiver operable to receive instructions that identify a network device location at which an in-place network device is to be exchanged with a replacement network device;
   a processor operable to cause the remote-controlled aircraft to:
     move to a first location and retrieve the replacement network device from the first location using the payload carrier;
     move to the network device location with the replacement network device;
     de-install the in-place network device from a network device docking station at the network device location using the payload carrier;
     install the replacement network device into the network device docking station using the payload carrier; and
     carry, via the payload carrier, the in-place network device to a location.

2. The remote-controlled aircraft of claim 1, wherein the network device docking station is attached to a mobile structure.

3. The remote-controlled aircraft of claim 1, wherein the network device docking station is attached to a stationary structure.

4. The remote-controlled aircraft of claim 1, wherein the in-place network device is selected from a group consisting of: a network device battery; an Internet of Things device, a sensor, and a radio.

5. The remote-controlled aircraft of claim 1, wherein the network device docking station is located within a housing, and wherein the housing includes an access panel.

6. The remote-controlled aircraft of claim 5, wherein the access panel is opened based upon an instruction sent to the network device docking station from a central control station.

7. The remote-controlled aircraft of claim 5, wherein the processor is further operable to cause the remote-controlled aircraft to wirelessly send, to the network device docking station, an instruction to open the access panel.

8. The remote-controlled aircraft of claim 1, further comprising:
   a camera operable to identify a receptacle in the network device docking station to accept the replacement network device.

9. The remote-controlled aircraft of claim 1, further comprising:
   a range finder operable to determine a distance from the remote-controlled aircraft to the network device docking station.

10. A remote-controlled aircraft comprising:
    a payload carrier operable to carry at least one network device;
    a wireless communication receiver operable to receive instructions that identify a network device fixed location at which the at least one network device is to be installed in a network device docking station, the network device docking station comprising at least one of a power connection configured to provide power to a device installed in the network device docking station and a data connection configured to provide data communications to the device installed in the network device docking station; and
    a processor operable to cause the remote-controlled aircraft to:
      move to the network device fixed location; and
      install the at least one network device into the network device docking station using the payload carrier to cause the at least one network device to be coupled to one of the power connection and the data connection.

11. The remote-controlled aircraft of claim 10, wherein the at least one network device is selected from a group consisting of: a network device battery; an Internet of Things device, a sensor, and a radio.

12. A remote-controlled aircraft comprising:
    a payload carrier operable to carry at least one network device;
    a camera;
    a wireless communication receiver operable to receive instructions that identify a network device location at which the at least one network device is to be installed in a network device docking station; and
    a processor operable to cause remote-controlled aircraft to:
      move to the network device location;
      capture, via the camera, an image of the network device docking station;
      analyze the image to identify the network device docking station in the image;
      align the payload carrier with the network device docking station based on the image; and install the at least one network device into the network device docking station using the payload carrier.

13. The remote-controlled aircraft of claim 12, wherein the at least one network device is selected from a group consisting of: a network device battery; an Internet of Things device, a sensor, and a radio.

14. The remote-controlled aircraft of claim 1, wherein the payload carrier comprises a plurality of bays, wherein each bay is configured to carry a network device.

15. The remote-controlled aircraft of claim 1, wherein the payload carrier comprises a spring, and wherein to install the replacement network device the payload carrier is configured to urge, via the spring, the replacement network device into the network device docking station.

16. The remote-controlled aircraft of claim 1, wherein the payload carrier comprises a screw drive, and wherein to install the replacement network device the payload carrier is configured to urge, via the screw drive, the replacement network device into the network device docking station.

* * * * *